United States Patent
Bohnhoff

[19]

[11] Patent Number: 6,095,718
[45] Date of Patent: Aug. 1, 2000

[54] SUBSURFACE FLUID DRAINAGE AND STORAGE SYSTEMS

[75] Inventor: William Walter Bohnhoff, Aurora, Colo.

[73] Assignee: Invisible Structures, Inc., Aurora, Colo.

[21] Appl. No.: 09/169,532

[22] Filed: Oct. 9, 1998

Related U.S. Application Data

[62] Division of application No. 08/796,304, Feb. 7, 1997, Pat. No. 5,848,856.

[51] Int. Cl.$^7$ .............................. E02B 13/00; E02B 11/00
[52] U.S. Cl. .................................. 405/52; 405/36; 405/43
[58] Field of Search ................................. 405/43, 45, 36, 405/50, 52, 16, 21, 29–35

[56] References Cited

U.S. PATENT DOCUMENTS

| | | |
|---|---|---|
| 2,183,657 | 12/1939 | Page ....................................... 405/50 X |
| 3,795,180 | 3/1974 | Larsen ........................................ 405/36 |
| 3,908,385 | 9/1975 | Daniel et al. .............................. 405/36 |
| 3,990,247 | 11/1976 | Palmer ....................................... 405/16 |
| 4,023,506 | 5/1977 | Robey ........................................ 405/36 |
| 4,044,179 | 8/1977 | Haas, Jr. . |
| 4,268,993 | 5/1981 | Cunningham . |
| 4,576,511 | 3/1986 | Vidal, Jr. . |
| 4,733,989 | 3/1988 | Harriett ..................................... 405/43 |
| 4,832,526 | 5/1989 | Funkhouser, Jr. . |
| 4,880,333 | 11/1989 | Glasser et al. ......................... 405/45 X |
| 4,881,846 | 11/1989 | Burkstaller . |
| 4,913,596 | 4/1990 | Lambert, III . |
| 4,917,536 | 4/1990 | Glasser ....................................... 405/45 |
| 4,925,342 | 5/1990 | Hendy ..................................... 405/36 X |
| 4,934,865 | 6/1990 | Varkonyi et al. ....................... 405/36 X |
| 4,943,185 | 7/1990 | McGuckin et al. .................... 405/43 X |
| 4,956,951 | 9/1990 | Kannankeril ........................... 405/45 X |
| 5,064,308 | 11/1991 | Almond et al. . |
| 5,123,778 | 6/1992 | Bohnhoff . |
| 5,197,824 | 3/1993 | Paurat et al. ........................... 405/36 X |
| 5,219,243 | 6/1993 | McCoy . |
| 5,250,340 | 10/1993 | Bohnhoff ................................ 405/41 X |
| 5,306,317 | 4/1994 | Yoshizaki ............................... 405/36 X |

FOREIGN PATENT DOCUMENTS

WO 98/35106  8/1998  WIPO .

*Primary Examiner*—Dennis L. Taylor

[57] ABSTRACT

There is provided by the invention a subsurface drainage system which promotes efficient and controlled subsurface drainage of fluids, such as irrigation water, applied to the surface of land such as a football field. A drain core apparatus is provided that provides rapid infiltration and later movement of subsurface fluids, but which is resistant to settling, compacting and crushing. The drain core is a thermoplastic mat having crush-resistant support members integrated with and upon a backing grid which holds the support members in spaced relation to one another. Fluid flowing into and through the drain core is collected and stored in a fluid storage container. The fluid storage container is adapted to be buried beneath the ground, and has an easily assembled internal support structure composed of vertically layered thermoplastic mats. The mats permit fluids to flow freely within the container, and yet lend vertical and structural stability to the container. Subsurface fluids gathered by the system may be re-applied to the surface to conserve water, fertilizer, and the like, to minimize evaporation, and to minimize water pollution.

20 Claims, 7 Drawing Sheets

SUBSURFACE FLUID DRAINAGE AND STORAGE SYSTEMS

CROSS REFERENCE TO RELATED APPLICATIONS

This application is a division of application Ser. No. 08/796,304, filed Feb. 7, 1997, and now U.S. Pat. No. 5,848,856.

BACKGROUND OF THE INVENTION

The present invention relates to systems for subsurface fluid drainage and storage, and more particularly to apparatus for promoting, directing, and storing rain and irrigation water drainage on and below the land's surface, such as beneath sporting events fields.

There is little dispute among sporting facilities managers and landscapers that adequate drainage is a key to maintaining quality grass or turf on sporting events fields such as football and soccer fields, baseball diamonds, golf courses, and the like. In any landscape incorporating cultivated turf and subject to significant usage and traffic, it is highly desirable to anticipate and control water entering upon the surface from rainfall, irrigation, and runoff from adjacent areas such as bleachers or parking lots. In this disclosure and in the claims, the term "surface," unless specifically indicated otherwise, refers to the surface of the ground in an area where efficient drainage is desired, including sports fields whose surfaces are covered with cultivated turf grasses, but also including other landscapes with or without turf.

When sporting facilities and the like must be used in the presence of excess water (beyond that needed for turf or other desirable plant growth) at the surface and the root zone, physical destruction of the soil structure and root system can be so extensive and profound that facilities use must be suspended for several weeks while repair and/or regrowth occurs. Many facilities, however, are economically and/or practicably prevented from discontinuing use during extensive rest and repair periods due to intensive and inflexible sports competition and other use schedules. In many instances, sporting play must continue on surfaces of decreasing quality until after the end of the playing season. It is extremely desirable, therefore, to promote adequate drainage from sports and performance fields, certain portions of golf courses and public parks, and the like, in order to prevent the waterlogging that leads to physical breakdown and destruction of turf and other landscaped surfaces.

Furthermore, quality water is an increasingly valuable resource, particularly in large cities and in arid climates. Substantial quantities of rainwater fall and, especially in dry climates, tremendous volumes of irrigation water are applied to sports fields, golf courses, and other surfaces. Most of the water percolates into the subsurface and/or is lost as uncontrolled runoff, frequently carrying with it undesirable quantities of artificial fertilizers and pesticides. It is desirable, therefore, not only to promote thorough drainage from vulnerable surfaces, but to control and store the drained liquid for re-use, such as re-application to the landscaped surface.

Considerable previous effort has been expended in the field of subsurface drainage systems for sports fields and the like. U.S. Pat. No. 3,908,385 to Daniel, et al., teaches a system for removing quantities of water from a playing surface using perforated pipe networks and vacuum pumping. According to the disclosure, the vacuum pumps used to draw away water are actuated by electronic moisture sensors. The use of vacuum pumps imposes certain substantial cost and reliability impediments to widespread popular use of the system.

U.S. Pat. No. 4,023,506 to Robey teaches a system for reinforcing turf surfaces with netting components, and discloses subsurface drainage control by means of slitted pipe drains placed in trenches dug into a subsoil base and covered with a waterproof layer.

U.S. Pat. No. 4,044,179 to Haas, Jr., discloses an artificial pile fabric surface layer overlying layers of sifted sand for use on playing fields and the like. The high pile height of the surface fabric, and the granular nature of the sand layers are purported to conduct away excess water and reduce water accumulation after rainstorms.

U.S. Pat. No. 4,268,993 to Cunningham discloses a complex system for providing subsurface irrigation as well as drainage. An impermeable membrane overlaid with layers of sorted sand and gravel are described as directing liquid drainage to pipe drains.

U.S. Pat. No. 4,576,511 to Vidal, Jr. teaches an apparatus and method for creating and controlling an artificial water table, and incorporates a watertight membrane covered with a ballast layer of crushed rock, covered with a permeable layer which in turn is covered with a fine layer and a finish layer of increasingly finely divided rock or other material. As disclosed, drainage occurs by water gravity flow through the ballast layer of rock and along the watertight membrane to a central location for pumped removal.

U.S. Pat. No. 4,832,526 to Funkhouser, Jr. shows an underground watering system employing a series of slitted pipes to introduce irrigation water into the subsurface.

U.S. Pat. No. 4,881,846 to Burkstaller teaches subsurface drainage using perforated pipes surrounded by stone aggregate and placed above an impermeable layer.

U.S. Pat. No. 4,913,596 to Lambert, III discloses a simple subsurface drainage system fairly representative of the general concepts found in the known art and incorporating a subgrade formed with a series of ditches having drain tile therein exteriorly covered with pea gravel, a layer of pea gravel over the subgrade including the ditches having drain tile covered with pea gravel, a layer of crushed stone over the layer of pea gravel, a layer of sand over the layer of crushed stone, and a soil mixture on top of the layer of sand.

U.S. Pat. No. 5,064,308 to Almond, et al., likewise teaches a system for subsurface drainage incorporating a network of perforated pipes covered with successive layers of pea gravel and sand.

U.S. Pat. No. 5,219,243 to McCoy utilizes a vacuum pump to pull subsurface drainage water into perforated pipes buried in gravel.

Most of the systems known in the art are variations on a fundamental scheme of providing lateral drainage through one or more layers of sorted gravel or crushed rock. In the typical known system, a layer of gravel underlies the smaller-particle root zone. Water passing through the root zone reaches the gravel layer, and then presumably flows laterally through the gravel layer to a perforated pipe or French drain for discharge into a nearby surface watercourse or into a storm sewer system. Known systems however, are vulnerable over time as the gravel settles into an ever more densely packed layer. As find sands filter down and fill voids in the gravel, the gravel layer's fluid transmissivity is adversely affected. Additionally, gravel's tendency to settle reduces the desirability of placing pipes within a gravel layer, as severe settling and compaction may lead to pipe rupture.

SUMMARY OF THE INVENTION

Accordingly, there is provided by the invention an artificial drain core apparatus for conveying water beneath the surface of the earth. The drain core comprises a laterally extensive backing grid made from thermoplastic and having a plurality of intersecting struts defining grid openings therebetween, and a plurality of spaced support members comprising thermoplastic and projecting from the backing grid, so that fluid may flow through the backing grid and between the support members. Each of the support members preferably comprises a tubular member upstanding perpendicularly from the backing grid and having a central longitudinal axis extending through an intersection of said struts forming the grid, whereby fluid may flow through the interior of the tubular member.

The invention also provides a system for promoting and directing fluid drainage from a land surface, the system comprising a subbase beneath the surface and having at least one sloped surface, a drainage collection point at the bottom of each sloped surface, and a drain core overlying the subbase. The drain core is substantially as described above, and comprises a thermoplastic mat with a laterally extensive backing grid having a plurality of intersecting struts defining grid openings therebetween, and a plurality of spaced support members projecting from the backing grid, whereby fluid may flow through the backing grid and between the support members. A semipermeable geotextile fabric disposed in flush contact upon said drain core, and preferably, but optionally, an impermeable liner is disposed between the subbase and the drain core. A perforated collector pipe is placed at each of the drainage collection points.

The fluid storage container of the invention comprises a flexible, generally impermeable envelope enclosing a fluid reservoir, and means within the reservoir for supporting the envelope vertically and horizontally, where the support means comprises at least two vertically stacked, laterally extensive mats, each mat comprising a backing grid having a plurality of intersecting struts and a plurality of spaced support members upstanding from the backing grid, whereby fluid may flow vertically through the backing grid and laterally between the support members. The system may include a pump in fluid communication with the container, so that fluid within the container may be pumped out of the container.

DETAILED DESCRIPTION OF THE PREFERRED EMBODIMENTS

The present invention relates primarily to the drainage and storage of irrigation water and rainwater from the surface and subsurface of sports fields, landscaped parks, golf courses, and the like, although it will be readily appreciated that aspects of the invention will find beneficial application in other fields of liquids drainage, control, and management, for example in hazardous waste management and/or remediation. Accordingly, while this disclosure emphasizes the drainage and storage of water, other fluids may be managed with the inventive system without departing from the scope of the invention.

The improved system for subsurface fluid drainage and storage involves a comparatively simple and inexpensive gravity flow system which reduces the amount of time excess water spends in the soil. In the practice of a preferred embodiment of the invention, water percolates only about 30.0 to about 45.0 cm. vertically down through the root zone before entering a physical drainage structure and then being transported to a collector pipe. Known subsurface systems typically require water to travel a meter or more vertically and/or horizontally before encountering a drain pipe from which effective drainage may occur. By underlying the entire surface to be drained with a drain core structure, the invention dramatically reduces liquid percolation and infiltration times and permits increased volumes of surface water to be drained away.

Figure 1:
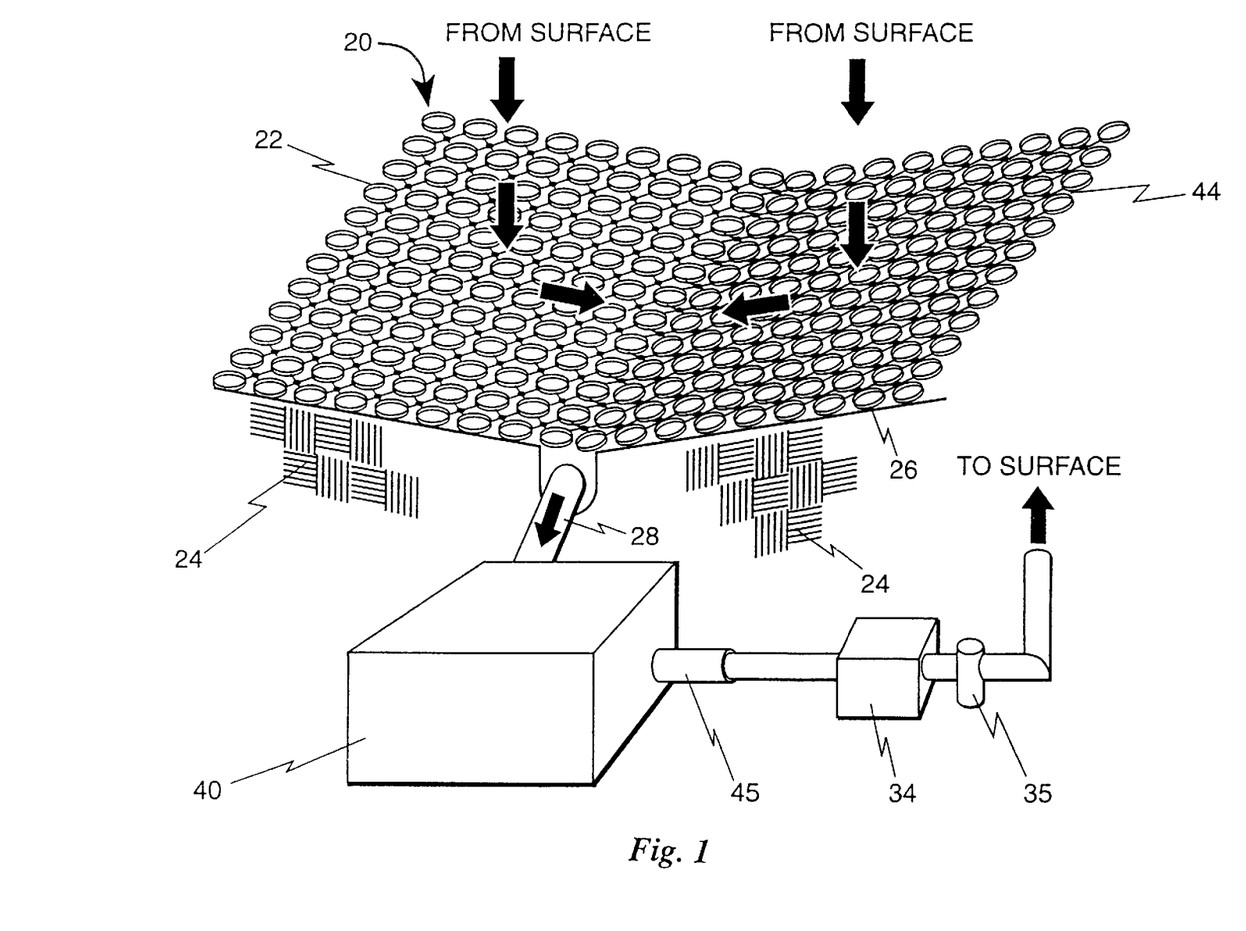
FIG. 1 is a schematic view of a preferred embodiment of the subsurface fluid drainage and storage system of the invention.
Figure 3:
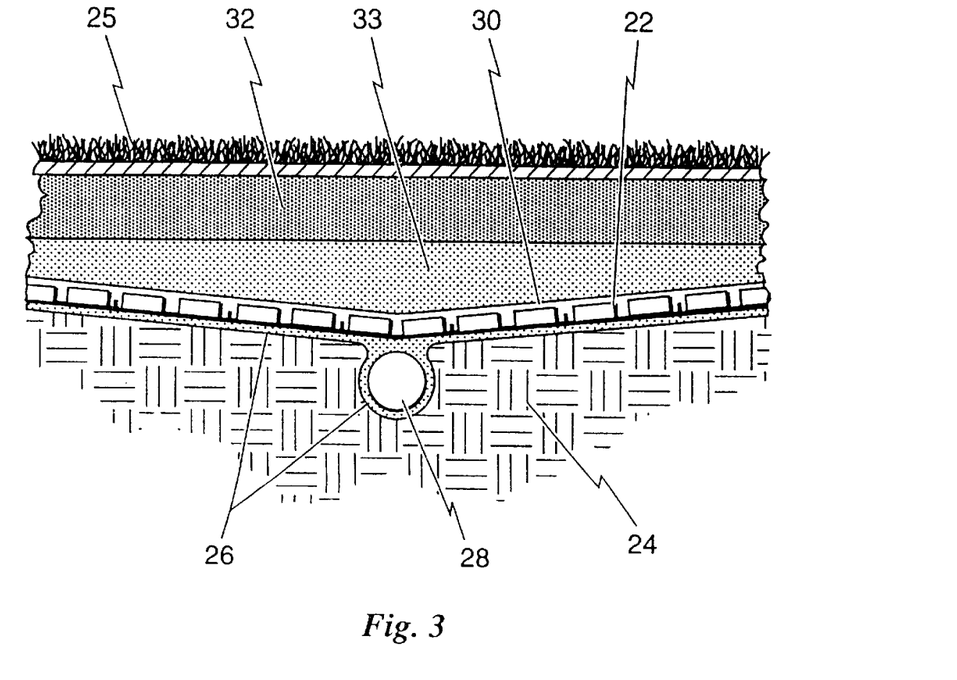
FIG. 3 is a sectional view of a portion of a preferred embodiment of the subsurface drainage system of the invention.
Figure 4:
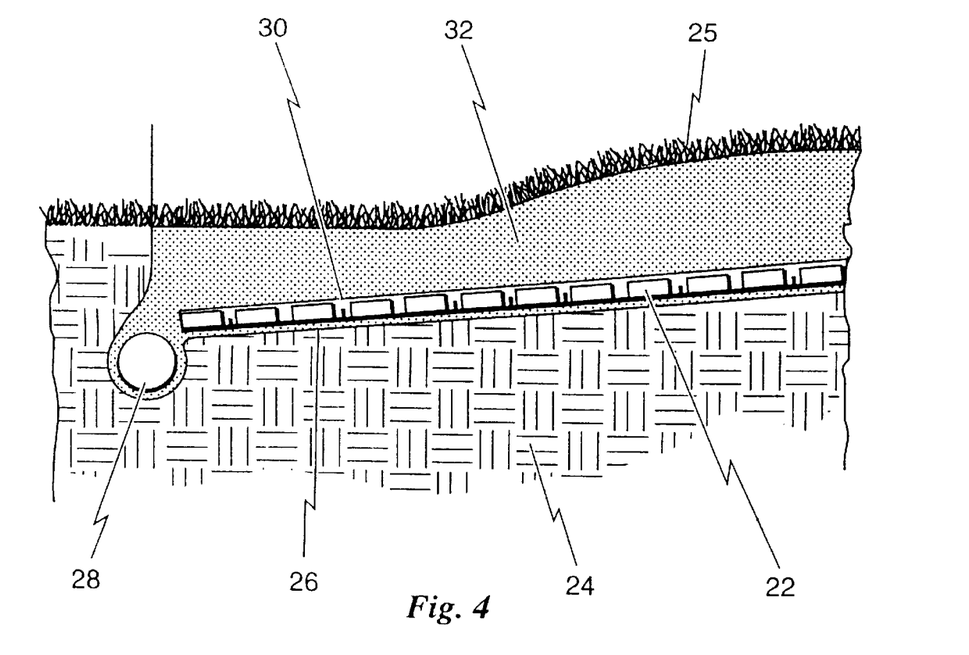
FIG. 4 is a sectional view of a portion of an alternative embodiment of the subsurface drainage system of the invention.

Referring to the drawings, wherein like reference numerals designate corresponding structure throughout the views, FIGS. 1, 3, and 4 illustrate that the inventive drainage system 20 utilizes a laterally extensive drain core 22 placed over a sloped subbase 24 beneath the surface 25. Subbase 24 comprises a subsoil that has been graded and packed to predetermined slope (e.g., 5%) to direct by gravity the movement of subsurface water. As shown in the figures, the subbase 24 is sloped, preferably from about 5 degrees to about 15 degrees, to induce downhill water flow, and a perforated collector pipe 28 preferably is installed at the down slope terminus of each sloped portion of the subbase 24. FIGS. 1 and 3 illustrate a subbase 24 graded to define a broad V-shaped basin with a collector pipe 28 at the bottom thereof, so that water drains down opposing sides of the basin toward a common collection point at the bottom of the basin. The invention is not limited to such a configuration, however, and any of a wide variety of sloped subbase arrangements may be drained by the system of the invention. The subbase 24 and the surface 25 may be of nearly any laterally extensive size, for example at least 10 square meters for a golf course bunker or the like, and up to at least 300 square meters in the case of a football field facility or adjacent soccer fields. FIG. 4, by way of non-limiting further example, shows that the surface of, for example, a golf tee may be underlain by a subbase 24 graded to define a single sloped surface with a collector pipe 28 disposed at the bottom collection point.

As shown schematically and by the directional arrows in FIG. 1, liquid infiltrating the ground from the surface percolates downward by force of gravity and then encounters the inventive drain core 22. As further indicated by the directional arrows, the liquid flows freely downhill through and along the drain core until reaching a collection point at the bottom of the sloped surfaces of the subbase 24, where it enters a perforated collector pipe 28 beneath the drain core 22 and below the grade of the subbase 24. The collector pipe 28 is pitched to provide drainage there along, so that the collected liquid may be discharged or, preferably, collected in a container 40 for treatment, off-site disposal, or re-use. An advantage of the invention is that liquid collected in the container 40 may be pumped, by means of a centrifugal or other pump 34, back to the surface for re-application, for example, as irrigation water. Optionally, a chemical and/or thermal sensor 35 may be integrated with the system to permit the chemical and/or thermal characteristics of the collected liquid to be monitored prior to or concurrently with the re-use of the liquid at the surface.

Reference is made to FIGS. 3 and 4. The drain core 22, to be further described herein, is an artificial mat structured to provide a permanent layer of subsurface air space or void through which large volumes of fluid may rapidly move. A waterproof liner 26 preferably, but optionally, underlies the drain core 22, between the drain core 22 and the subbase 24. Alternatively, in instances where it is desirable to allow some permanent deep infiltration of surface drainage, waterproof liner 26 may be replaced with a semi-permeable geotextile fabric. A layer of geotextile fabric 30 is disposed flush upon the top surface of the drain core 22, and acts to prevent migration of root zone medium 32 or washed sand 33 materials into the structure of the drain core 22. Preferably, a layer of clean, sharp concrete sand 33 is layered directly upon the geotextile fabric 30. A sand-based root zone medium 32 is deposited to a suitable depth, preferably from approximately 30.0 cm. to approximately 45.0 cm., preferably above the layer of sand 33 as depicted in FIG. 3, or alternatively directly atop the geotextile fabric layer 30 as shown in FIG. 4. The entire surface 25 at the top of the root zone medium 32 may then be graded flat (FIG. 3) to provide an optimal playing field, or may be otherwise contoured and landscaped (FIG. 4) as desired.

Depending upon the size and shape of the surface to be drained, and upon the graded configuration and number of sloped surfaces of the subbase 24, a plurality of collector pipes may be networked according to known hydraulic principles to channel and direct into a trunk collector pipe the liquids gathered and drained from the drain core layer 22. Preferably, as suggested in FIG. 1, a main trunk collector pipe 28 is connected to the subsurface container 40 of the inventive system. The subsurface container 40, also to be further described, is manufactured from many of the same materials comprising the drainage system 20, and permits the drained fluids to be safely stored for later processing or re-use.

Figure 2:
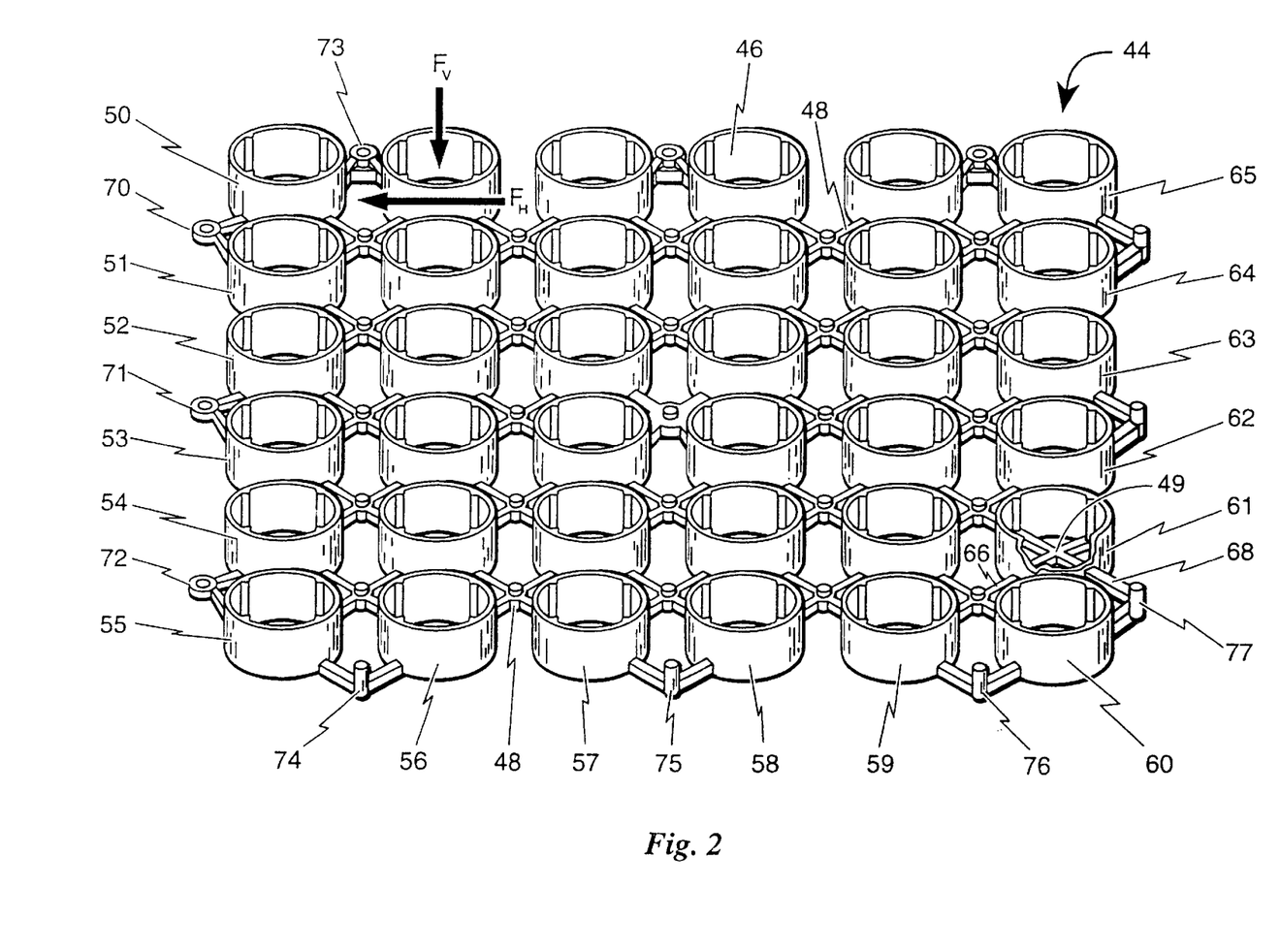
FIG. 2 is a perspective view of the mat element of the present invention.

FIG. 2 is a detailed view of a portion of a mat 44 component utilized in the construction of a preferred embodiment of the invention. Many of the advantages of the invention result from the use of the mat element 44 in the drain core 22 and subsurface container 40 of the system. Essentially the same type of mat element 44 is used to construct the drain core layer 22 as is used in the subsurface container 40. Mat 44 provides three-dimensional structural form to those components while not substantially impeding the tri-directional free flow of fluids through those components.

Each mat 44 is assembled from a plurality of interlinked individual mat panels 46. FIG. 2 shows a single panel 46, but it is understood that in the ordinary practice of the invention a large plurality of substantially identical panels 46 are interconnected in two lateral dimensions, the contiguous plurality of panels 46 thus comprising a single, laterally extensive mat 44. Each panel 46 preferably is composed of injection-molded plastic, such as high-density polyethylene or polypropylene. Panels 46 manufactured from low-density polyethylene are also applicable in situations where reduced cost or increased flexibility are desired. Certain elements of each panel 46 are designed and manufactured to have an inflexible rigidity that provides structural strength to the container 40 and to the drain core 22, yet other portions of each panel 46 are shaped to be flexible to permit easy rolling, transportation, manipulation, and placement of the mats 44 for installation of the drain core 22 and/or assembly of the container 40. More specifically, each panel 46 possesses a backing grid 48 made from a large plurality of intersecting struts, and a plurality of spaced support members projecting from the backing grid 48. Certain support members are labeled at 50–65 in FIG. 2, but it is readily understood from the figure that a given panel includes a number of other identical support members. The backing grid 48 provides flexibility to the overall panel 46, while the support members 50–65, which are upstanding, preferably perpendicularly, from the grid 48 lend desired rigidity. A panel 46 substantially similar to that described herein, and adaptable for use in the present invention, is disclosed in U.S. Pat. No. 5,250,340 entitled "Mat for Stabilizing Particulate Materials," the disclosure of which is incorporated herein by reference.

As mentioned, each mat 44 preferably is assembled from a plurality of individual mat panels 46, that is, multiple panels 46 are laterally integrated to create a mat 44 for use within the drain core 22 or within the container 40. Accordingly, each mat 44 generally manifests all the characteristics of a single panel 46, and description of a single, modular, panel generally serves to describe an integrated mat 44; the mat 44 is merely more extensive in size.

Support members 50–65 lend integrity and strength to the panel 46. Backing grid 48 is moderately flexible in a vertical direction perpendicular to the plane of the panel 46, interconnects the support members 50–65, and maintains the support members 50–65 in a spaced-apart relation to each other. As shown in FIG. 2, the support members 50–65 preferably are uniformly arrayed horizontally in perpendicular rows and columns. In the illustrated embodiment, the support members 50–65 are fashioned in the form of cylindrical rings, but it will immediately be appreciated that support members of other than cylindrical shape may be used in the invention. Support members 50–65 having hexagonal, square, rectangular or other cross-sectional shapes may be utilized, but support members 50–65 preferably are generally tubular so that water, air, and other fluids may flow freely through or past the support members, as indicated by the directional arrow $F_v$ in FIG. 2. Solid non-tubular support members alternatively may be used with reduced beneficial effect, as generally tubular support members are highly preferred for lending structural integrity to the mat 46 while not interfering unduly with fluid flow $F_v$. Also, the support members 50–65 need not be arrayed in perpendicular rows and columns, since circular, random, or other arrays may function within the scope of the invention. The support members 50–65 are of a uniform height, and thus serve to define the overall thickness of the mat 44, typically but not necessarily approximately 2.5 cm.

The support members 50–65 are preferably molded integrally with the generally planar backing grid 48, which is defined by a plurality of perpendicularly intersecting struts. As seen in FIG. 2, each support member, for instance support member 52, preferably is centrally disposed with respect to an intersection 49 of two struts 66 and 68, so that each support member 52 has a central longitudinal axis extending through an intersection of struts. Each pair of intersecting struts 66, 68 are securely joined at their respective intersection 49, so that the overall plurality of intersecting struts defines a strong yet flexible network resistant to stretching or tearing. As with the support members 50–65, the particular pattern created by the array of struts is not critical, and it is contemplated that the struts 66, 68 may be arranged to intersect other than perpendicularly. To promote a strong mat 42, however, it is preferred that each support member 52 be centrally located about the intersection 49 of two struts 66, 68, and be integrally attached to the corresponding struts. Notably, the panel 46 is generally flat with a constant thickness, and defines two substantially parallel imaginary planes, one plane containing the backing grid 48 and the other plane generally defined the uppermost surfaces of the support members 50–65. Advantageously, fluids may freely flow through the grid openings between struts. Also, the integration of the support members 50–65 with the backing grid 48 maintains adjacent support members in a spaced-apart relation, leaving ample space through which fluids may flow as indicated by the directional arrow $F_H$ in FIG. 2.

A plurality of panels 46 are secured together to compose a large mat 44 of practically any required size. To foster rapid and secure attachment between laterally adjacent panels 46, complementary sets of fasteners are formed on the side edges of each panel 46. In the illustrated embodiment, the first fasteners are fashioned in the form of sockets, for example sockets 70, 71, 72, 73 disposed along two adjacent sides of each quadrilateral panel 46, and the second fasteners are fashioned in the form of pins such as pins 74, 75, 76, 77 along the other sides of the panel 46, so that the pins are disposed opposite the sockets. Any two panels 46 may be secured in adjacent relation by inserting the pins 74, 75, 76, 77 spaced along one side of one panel 46 through the sockets 70, 71, 72, 73 spaced along the side of another substantially identical panel 46. The upper ends of the pins 74, 75, 76, 77 may then be deformed to prevent the pins from being withdrawn from the sockets 70, 71, 72, 73. A manner and mode of securing adjacent panels 46 together using a pin-and-socket system like that illustrated in FIG. 2 is described in U.S. Pat. No. 5,250,340. The '340 Patent, incorporated herein by reference, offers further detailed description of a mat element 44 suitable for use within the present invention.

Attention is again directed to FIGS. 1, 3 and 4.. The drain core 22 layer comprises a mat 44 assembled from a plurality of panels 46 as previously described. Accordingly, the drain core 22 comprises an artificial structural layer of a defined, uniform, substantially invariable thickness. The support structures 50–65 forming an integral portion of the mat 44 provide rigidity and resistance to collapse in the vertical direction, and are capable of sustaining the substantial weight of the root zone medium 32 without undergoing significant compression or shifting, either upon first placement or after sustained loads over time. The spaces between and through the support members 50–65 permit water and air to flow freely laterally and vertically therebetween. The mat 44 comprising the drain core 22 accordingly defines a layer of extremely high transmissivity through which relatively large discharges of fluids freely flow under gravity. Water enters the drain core 22 vertically from above without substantial impedance, and, after encountering the semipermeable subbase 24 or, preferably, the waterproof liner 26, flows freely laterally toward the collection point where it is collected in the collector pipe 28.

The use of the mat element 44 comprising the drain core layer 22 offers several advantages over known drainage systems. Typically in the art, a drainage core layer comprises crushed rock or sorted gravel. Drainage core layers composed of such natural materials tend to display non-uniform transmissivity, and are prone to settle and compact over time, reducing transmissivity and potentially creating uneven or low spots at the surface. Also, it is known to cover drain core layers with permeable geotextile fabric layers to prevent small root zone particles from infiltrating, filling, and clogging the interstitial space in the drain core; yet natural rock drain core layers are characterized by an uneven and jagged top surface and therefore do not provide a hospitable surface upon which to place a geotextile membrane to prevent particulate infiltration. In contrast, the drain core 22 of the present invention displays an almost perfectly uniform transmissivity across large areas. Drain core 22 is virtually non-compactable over time, so transmissivity remains generally consistent during the useful life of the system. And the surfaces of each mat 44 comprising the drain core 22 are essentially planar with no jagged edges to complicate the installation of an overlying geotextile layer or to puncture the geotextile during or after installation thereof.

The high volume capacity and fluid transmissivity of the drain core 22, and its near immunity to settling and compaction, also provides a reliable long-term means for circulating heated or other treated fluids throughout the entire subsurface. Hcatcd air, for example, can be pumped into one edge of the drain core 22 and withdrawn from another edge, allowing the heat to rise to, for example, an overlying football field in cold climates. Coupled with the use of an insulated field blanket, this feature of the drain core 22 can extend the turf growing season for the field, and improve field conditions during snow storms. Alternatively or additionally, small diameter pipe networks may be installed in the drain core 22 between the support structures of the mat 44 to provide subsurface heating or irrigation or the like.

A root zone soil mix is placed to a depth of from about 230 mm. to about 400 mm. as the root zone medium 32. The mixture preferably includes water and nutrient-holding polymers to conserve irrigation water between cycles, in addition to humus with micronutrients and bacteria to establish an optimum turf-growing medium. Porous ceramic amendments may be added to retain and optimize water holding capacity, while sufficient sand is admixed to obtain a water infiltration rate of about 100 mm to 150 mm per hour.

The installation of the preferred embodiment of the drainage system 20 is briefly described with continuing reference to FIGS. 3 and 4. The subbase 24 is graded according to methods and designs known in the art to define one or more surfaces sloping down to points or lines of fluid collection, that is, points toward which fluids flow upon the subbase's sloping surfaces. The subbase 24 preferably is packed to about 95% modified proctor density. A perforated collector pipe 28 is installed in a trench cut into the subbase 24, generally along each collection point at the bottom of each sloping surface of the subbase 24. Multiple collector pipes 28 are interconnected, as needed, to define a collector pipe network through which water will flow by gravity. The trench containing the collector pipe 28 is then backfilled with small gravel to the grade of the subbase 24.

After the installation of the collector pipe 28, optional, but desirable, systems are placed. Examples include an irrigation distribution system and risers, and/or heat distribution manifolds for connection to the drain core 22 or to a pipe network to be placed within the drain core are installed. Also, foundations for such surface structures such as goalposts, bleachers, stages, and the like are placed.

The waterproof liner 26, or, alternatively, a non-woven needle-punched semipermeable geotextile layer, is placed directly upon the subbase 24 to conform to its profile. The waterproof liner 26 is placed continuously below the collector pipe 28 (FIGS. 1 and 3) to allow water to flow down from the drain core 22 into the collector pipe 28. Joints in the liner 26 are overlapped and/or sealed by heat or solvent to prevent leakage. The drain core 22 is installed directly upon the waterproof liner 26. As mentioned, the drain core 22 preferably comprises a single layer of mat 44. Because mats 44 may be supplied to the site in large rolls (e.g. up to about 2.5 m×50.0 m×0.025 m thick), installation of the drain core 22 is simplified by simply unrolling mats 44 upon the liner 26, a tremendous installation advantage over crushed rock or gravel drain cores. In extensive installations, adjacent mats 44 may be joined in the field using the pin-and-socket features previously described. Generally, the backing grid 48 side of the mat 44 is placed face up, towards the ground surface and away from the subbase 24, to provide a smooth profile upon which to lay the geotextile fabric 30. If the waterproof liner 26 is prone to tear or puncture, a lower protection layer of geotextile fabric (not shown) optionally may be placed between the drain core 22 and the liner 26 to prevent penetration of the liner 26 by the support members 50–65 of the mat 44, and also to foster fluid escape from within the generally upstanding tubular support members. The flexibility of the backing grid 48 on each mat 44 permits the drain core 22 to bend and flex to adapt to the overall contour and profile of the underlying subbase 24, yet the rigidity of the support members 50–65 on the mat 44 maintains the uniform thickness of the drain core 22.

Mats 44 comprising the drain core 22 may be placed in nearly any array, offering optimum efficiency and fewest cuts. Notably, the present invention permits drain core 22 to be installed under virtually every square foot of the surface 25 of concern. Since the drain core 24 underlies the entire surface 25 at a modest depth, water falling on the surface 25 seldom travels downward more than about 45 cm to 50.0 cm before encountering the drain core 22, resulting in rapid transportation of the water from beneath the surface and towards storage or discharge, as indicated by the directional arrows of FIG. 1.

A layer of geotextile fabric 30, such as a non-woven heat calendared geotextile, next is placed upon the drain core 22 using shingle-overlapped joints of at least 23 cm. The widest roll of fabric 30 possible is used to minimize joints, and all joints should be secured with duct tape or similar fastener to prevent small particle intrusion through the fabric layer 30 and into the drain core 22.

A washed concrete type sand 33 is placed upon the upper layer of geotextile fabric 30 to a depth of at least 15.0 cm to define the lower boundary of the root zone medium 32. The preferred root zone mix previously described then is placed upon the boundary layer of sand to complete the deposition of the root zone medium 32. The root zone medium 32 is topped with washed soil-less sod or other landscaping media.

Figure 8:
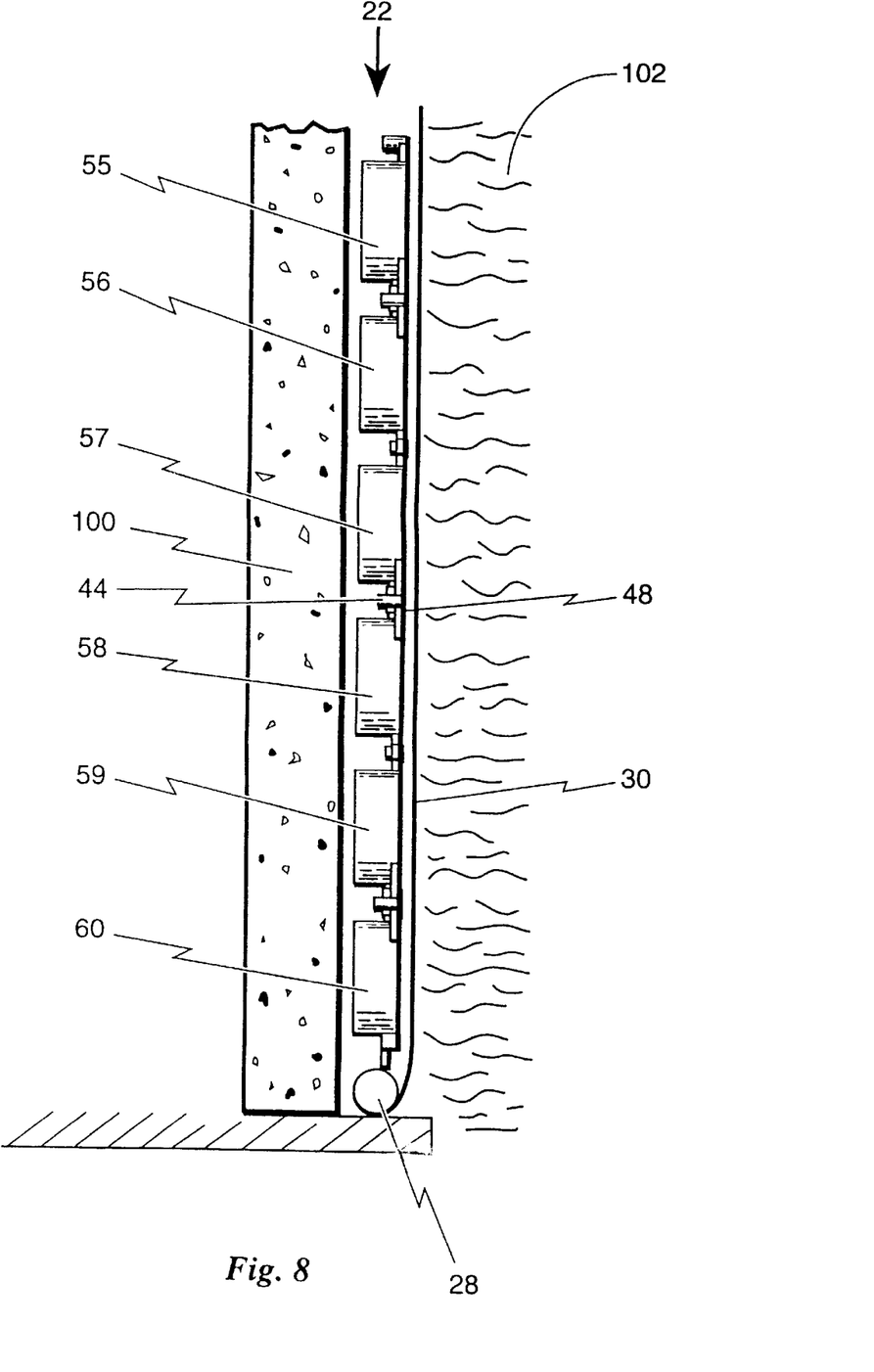
FIG. 8 is a sectional view similar to FIG. 4 showing an alternative configuration of the drainage system of the present invention for draining fluid away from a subsurface structure.

FIG. 8 schematically illustrates an alternative configuration of the invention, where a mat 44 serves as a vertically disposed drain core 22 located substantially adjacent to a subsurface structure such as a foundation wall 100, or some other structure to be protected from drainage or hydrostatic pressure. The mat 44 is configured substantially as previously described, and one or more mats 44 collectively are sized to correspond to the vertical face of the wall 100. The various support structures 55–60, rather than being mostly horizontal, are vertically aligned to permit free drainage of fluid down the face of the wall 100. In a preferred installation, the drain core 22 is installed with the backing grid 48 facing toward the source of water and away from the wall 100 or other structure to be protected. In the event the core 22 is placed against soft insulation panels, waterproof membranes, or other easily damaged materials, a protective layer of geotextile fabric (not shown) may be placed between the core 22 and the sensitive layer. A wood nailing strip (not shown) may be fastened to the wall 100, and the mat 44 hung vertically and fastened to the wood strip with screws or nails. A roll of geotextile fabric 30 preferably is then placed over the drain core structure 22 and secured at the top by fastening to the wood strip or to the core 22. A perforated collector pipe 28 is disposed below the vertically oriented drain core 22 to collect and convey away the fluid that flows down the core 22. A layer of geotextile fabric 30 is placed over the drain core 22 and may be secured at the top to the wood strip. During the installation of both the core 22 and the fabric layer 30, some "slack" is provided, so that the placement of backfill 102 material does not dislodge the mat 44 or the collector pipe 28. The mats 44 may be cut or bent to meet inside or outside corners. Joints in the geotextile fabric layer 30 are overlapped and secured with tape or the like to prevent soil intrusion. The backfill 102 preferably is installed as quickly as possible after the core 22 and geotextile layer 30 have been placed against the wall 100, with care taken to avoid tearing the fabric layer 30. The backfill material 102 preferably includes low quantities of silts and clays, which tend to clog the fabric layer 30.

Thus, the drainage system of the invention includes an embodiment for promoting drainage from the wet side of subsurface structures such as foundation walls. The installation of the mats 44 comprising the vertical drain core 22 seen in FIG. 8 is accomplished substantially faster and with greater reliability than previous protective methods. Known methods for promoting drainage from subsurface vertical structures typically call for a layer of gravel to be placed against the wall 100, but such installations are imprecise and suffer from the drawbacks previously described associated with gravel drains.

Figure 5:
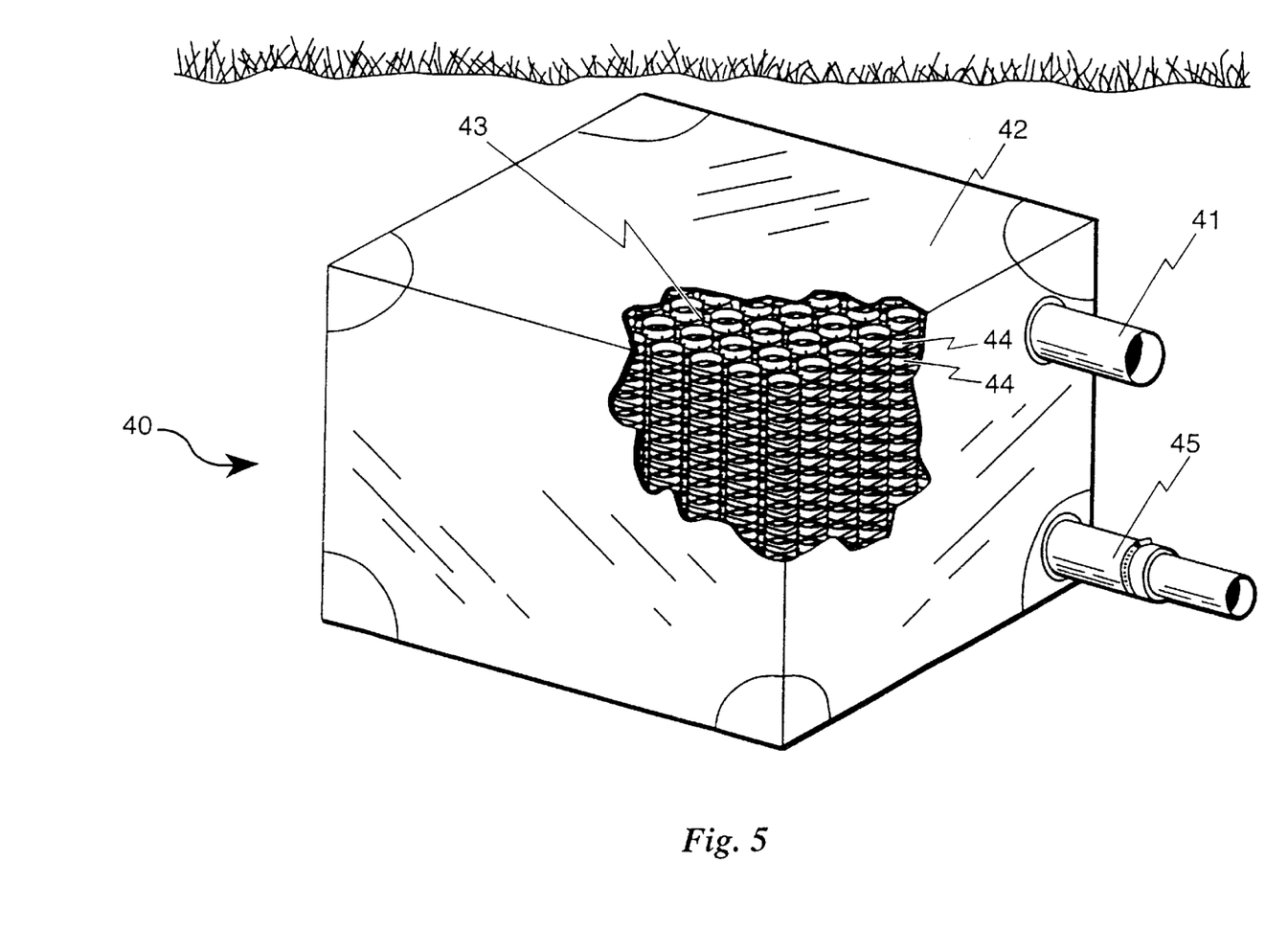
FIG. 5 is a perspective view of the container component of the invention with a portion broken away to show certain interior elements.

Turning now to FIGS. 1 and 5, the preferred embodiment of the invention includes the subsurface fluid container 40 utilized for receiving and storing the fluids gathered and discharged by the drainage structure 20. Container 40 includes a flexible impermeable envelope 42 substantially enclosing a fluid reservoir 43. Within the envelope 42 is an interior supporting framework comprising two or more vertically stacked mats 44 of the type previously described. Mats 44 support the envelope 42 both laterally and vertically and thus give structural stability to the container 40 while occupying an acceptably small interior volume of the reservoir 43. No exterior framework is required to support the envelope 42. While the stacked mats 44 act as a sort of baffle against gross movement of fluid within the reservoir 43, the mats 44 by their configuration do not significantly impede the flow of liquids into or out of the reservoir 43 during filling or draining.

The envelope 42 is comprised of impermeable plastic, for example, PVC. If an alternative use, besides storage of surface water drainage, is made of the storage container 40, alternative liner materials may be used. For example, HYPALON is preferred for use in storing potable water, and other materials are suggested in the event other fluids, such as dangerous chemicals, are to be stored in alternative application of the invention.

The container 40 initially is deposited above ground (but below grade) and then is backfilled and buried for additional support and security. The invention permits the construction of a container of practically any size, but it is contemplated that a typical container may be a rectangular or cubic box with dimensions of approximately 1.0 m to 2.0 m on a side, although containers with much larger lateral dimensions are possible. Container 40 may be disposed within a flat-bottomed basin excavated into the subbase 24 to the appropriate size. No reinforced foundation for the container 40 is required, and the container 40 may be deposited directly upon the subbase 24.

Figure 6:
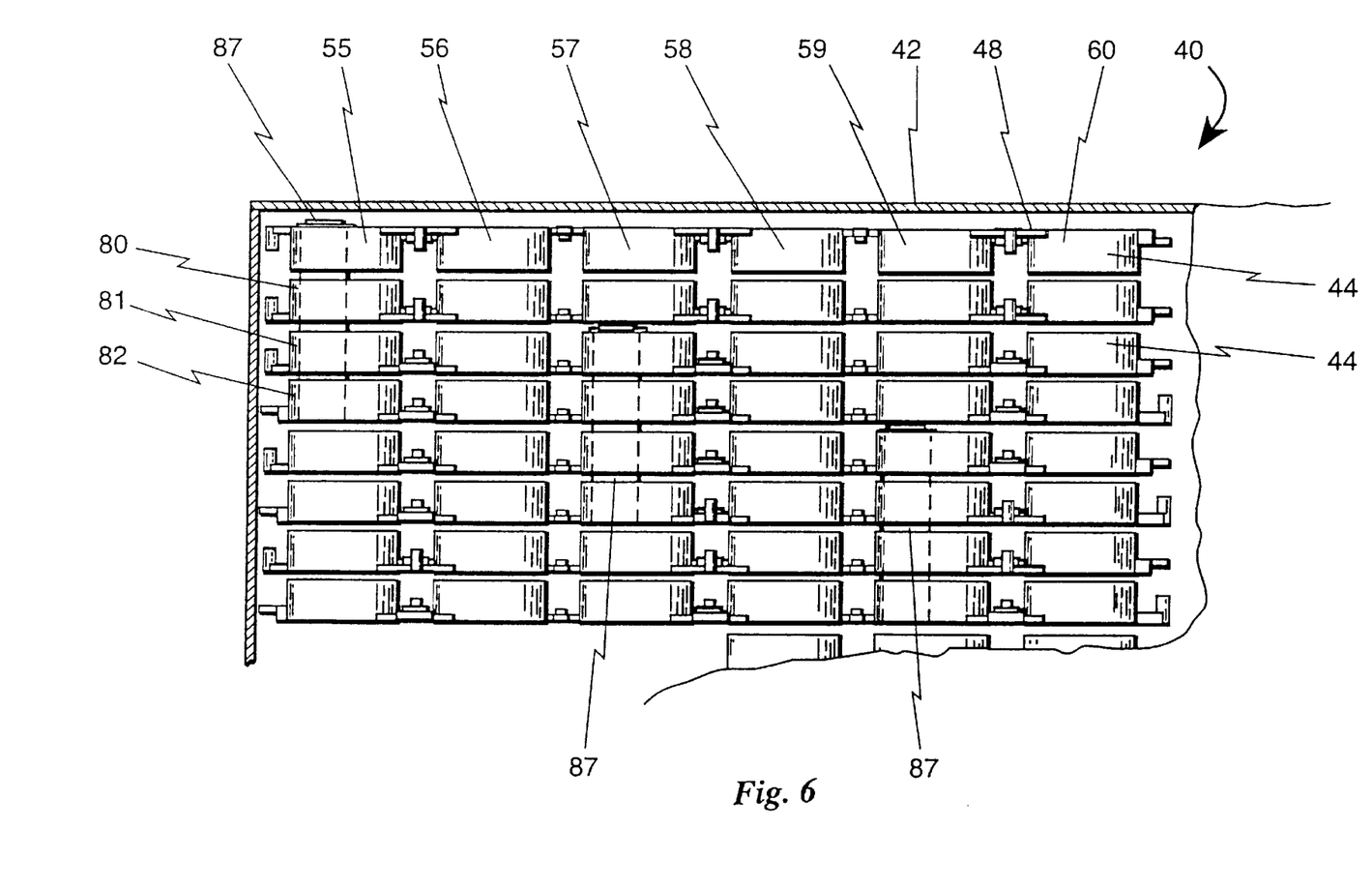
FIG. 6 is an enlarged end view of the broken-away portion of the container element as shown in FIG. 5.

A sheet of envelope material, such as PVC, substantially larger than the planned size of the bottom of the container 40 is placed upon the subbase 24. Preferably the lateral dimensions (e.g. length and width) of each of the stacked mats 44 correspond to the lateral internal dimensions of the container 40, so that no mats need be severed or joined laterally to erect the container 40. As best seen in FIG. 6, at least two, but preferably a large plurality, of uniformly sized mats 44 are stacked vertically one upon the other until they attain the desired height of the container 40. The mats are stacked backing grid 48 side down, so that a smooth backing grid 48, rather than projecting support members, is in contact with the portion of the envelope defining the bottom of the container 40. Preferably, the erection of the stack of mats 44 easily is performed by unrolling rolls of mats 44 that have been shipped to the job site. In such instances, it is preferable, but not required, to unroll each mat 44 in a direction ninety degrees crosswise from vertically adjacent mats 44. Alternatively, the mats 44 may be assembled on site by joining numerous mat panels 46 (FIG. 2).

In a preferred embodiment, since the support members 50–65 are uniformly positioned on quadrilateral panels 46, the support members in stacked mats 44 will be aligned in vertical columns with a common axis, as seen with support members 55, 80, 81, and 82 in FIG. 6. The resulting three-dimensional array of support members permits fluid to flow freely throughout the fluid reservoir 43. Notably, the reservoir 43 may be completely gravity drained if desired, with the plurality of stacked mats 44 able independently to retain only an insignificant amount of fluid.

Figure 7A:
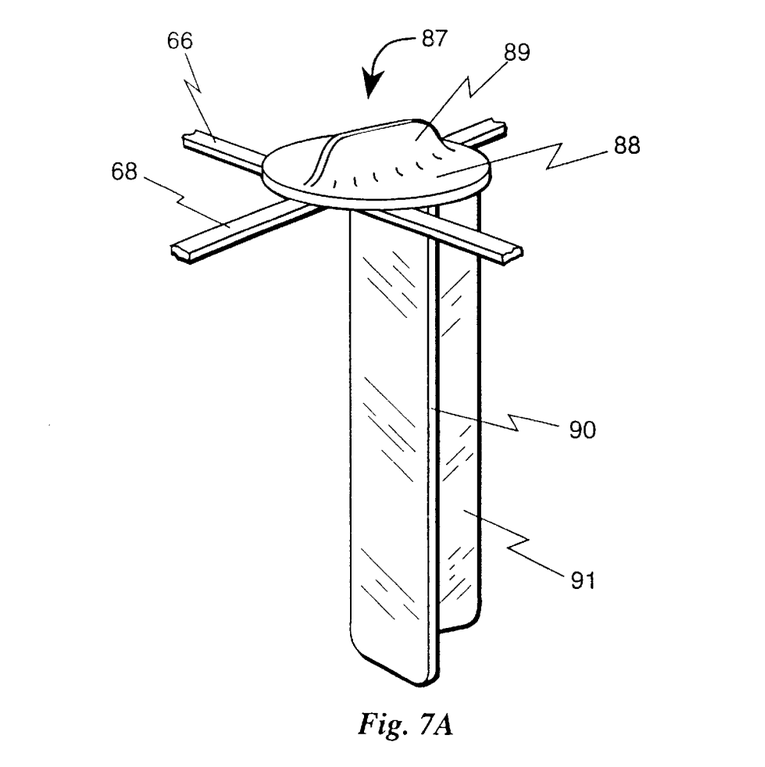
FIG. 7A is a perspective view of a clip component of the invention.
Figure 7B:
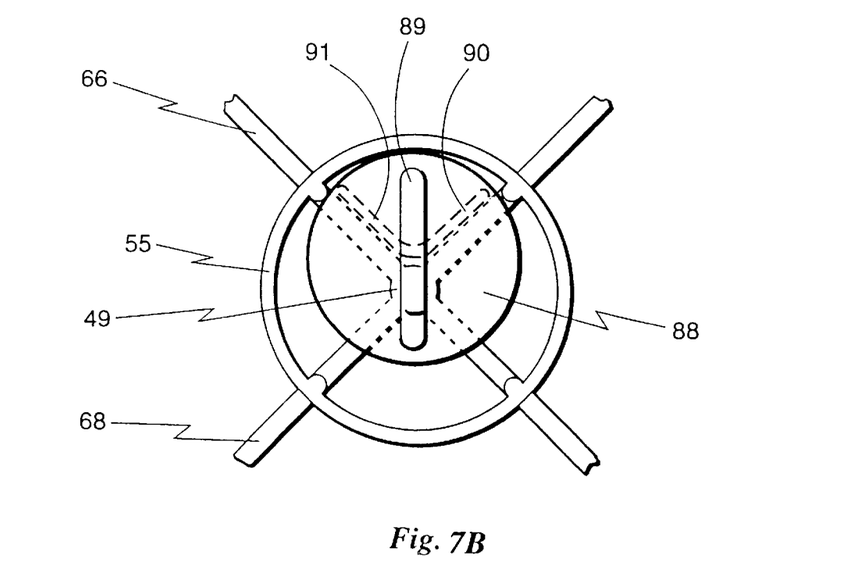
FIG. 7B is a top plan view of the clip component of FIG. 7A inserted into a portion of the mat element of the invention..

FIGS. 6, 7A and 7B show that during the stacking of multiple mats 44, clips 87 may be inserted within the interiors of at least two, but preferably four, vertically adjacent support members, such as members 50, 80, 81, 82 in FIG. 6, to improve the stability and maintain the alignment of the stack of mats 44. Clips 87 preferably are comprised of the same material as the mat 44, and preferably have a length substantially corresponding to the thickness of four vertically stacked mats. As seen in FIGS. 7A and 7B, each clip 87 preferably comprises a pair of longitudinally directed flanges 90, 91 extending from a cap 88. The flanges 90, 91 are joined along a common longitudinal edge to define by their intersection an approximately right angle; as best seen in FIG. 7B, the flanges optionally are fashioned from single planar element bent to define an angle of about 90°, which may result in a slight curve at the point of bending, but alternative embodiments are made by joining two separate planar flanges. A cap 88 preferably having a finger grip 89 is permanently attached to an end of the flanges 90, 91.

FIG. 7B shows that a clip 87 in use is manually inserted vertically downward into the inside of a support member 55 with each flange 90, 91 contacting a respective one of the struts 66, 68 which intersect at the axis of the support member 55. The outside edges of the flanges 90, 91 also may slidably contact the inside wall of the support member 55. As suggested in FIG. 6, the clip 87 is further inserted down through the interiors of vertically aligned support members in underlying layers of mats 44, for instance members 80, 81, and 82 in FIG. 6, until the clip cap 88 contacts the struts 66, 68 at the upper-most support member 55. The cap 88 is sized to prevent the entire clip 87 from being insertable between the struts 66 and 68 and a support member 55, thus fixing the vertical position of the clip 87 within the plurality of stacked mats 44. The flanges 90, 91 mildly, frictionally engage successive support members 55, 80, 81, 82 and backing grids 68 in adjoining layers of mats to hold the support members, 50, 80, 81, 82 in vertical alignment. A plurality of clips 87 preferably are utilized at various locations throughout the stacked mats 44, and are inserted during stacking at staggered locations both laterally and vertically within the stack. FIG. 6 shows a possible pattern of staggered vertical placement of clips 87 where each clip 87 has a length permitting it to conjoin four layers of stacked mats 44, with a vertical offset of just two lays of mats between laterally neighboring clips 87 to integrate all the mats 44 into a supporting framework. Accordingly, as multiple clips 87 are inserted throughout the stacked mats 44, the mats 44 are resistant to excessive horizontal sliding with respect to one another and the overall stability of the container 40 is markedly improved.

The topmost mat 44 in the stack preferably is placed in an inverted position with respect to all the other mats, as seen in FIG. 6, to present the smooth surface of a backing grid 48 for contact with the portion of the envelope 42 defining the top of the container 40. With a plurality of mats 44 stacked to the desired height, the envelope material is then folded up to surround and enclose the mats 44, making flush contact with the sides and top of the stack of mats 44. The envelope 42 accordingly assumes the same exterior shape as the stack of mats 44, and the fluid reservoir 43 has a gross volume corresponding to the volume occupied by the plurality of mats 44. Necessary seams in the envelope 42 are heat or solvent welded, and the corners of the envelope 42 preferably are reinforced with another layer of envelope material adhered thereto. Holes in the envelope 42 are cut at desired locations to provide for one or more fluid inlets 41 and outlets 45, respectively. Each inlet 41 and outlet 45 may be improved by heat or solvent welding a tubular cylinder or "boot" of envelope material around each hole in the envelope 42, into which a collector pipe 28 may be inserted and secured with an exterior circular clamp, as seen in FIGS. 1 and 5.

The remaining void around the container 40 preferably is backfilled with sand, and the container is buried beneath a layer of topsoil. The layers of mats 44 provide the container 40 with resistance to collapse in both the vertical and the horizontal direction, and yet are sufficiently flexible to allow some shifting and flexing of the container 40, to adapt to the precise underlying contour or to minor earth movement, with reduced risk of container rupture. Because the container 40 is buried, it offers the advantages of reduced evaporation and minimal growth of undesirable algae. Moreover, the buried container poses no drowning hazard, and the contained fluid is insulated from surface conditions and temperature, and from evaporation.

In one manner of practicing the invention, irrigation water applied to the surface 25 infiltrates through the root zone medium 32. Fertilizers and pesticides previously applied to the surface dissolve in the downwardly moving water. The water moves rapidly through the root zone medium 32, carrying fertilizer or pesticide in solution. Water penetrates the geotextile fabric 30, immediately enters the drain core 22, flows rapidly and predictably to the collection point above the collector pipe 28, enters the collector pipe 28, and is conveyed to the container 40 for storage. When desired, pump 34 may be actuated to pump water from the container 40 back to the surface, where it is reapplied through a sprinkler system, a hose, or the like as irrigation, including the reapplication of the fertilizer and pesticide compounds in solution therewith. The quality of the water returned to the surface may be electronically monitored using sensor 35 to assure optimum water quality. Water from the container 40 may be applied alternately with fresh irrigation, or can be diluted with fresh irrigation, as needed. Valuable water and chemical resources are thereby conserved and reused, and undesirable point source and non-point source discharges of fertilizer and pesticide contaminated water into stream courses minimized.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An apparatus for containing fluids, said apparatus comprising:
    a flexible, impermeable envelope enclosing a fluid reservoir said envelope including a port to permit fluid communication between the interior and the exterior of said container; and
    means within said reservoir for supporting said envelope vertically and horizontally, said means comprising at least two vertically stacked laterally extensive mats, each said mat comprising:
        a backing grid having a plurality of intersecting struts defining grid openings therebetween; and
        a plurality of spaced support members projecting from said backing grid, whereby fluid may flow vertically through said backing grid and laterally between said support members.

2. The apparatus of claim 1, wherein each of said support members comprises a tubular member upstanding substantially perpendicularly from said backing grid and possessing a central longitudinal axis extending through an intersection of said struts forming said grid, whereby fluid may flow vertically through the interior of said tubular member.

3. The apparatus of claim 2, wherein said support members are substantially cylindrical.

4. The apparatus of claim 3, wherein said support members are disposed upon said backing grid in a uniform substantially rectangular array defined by a plurality of substantially perpendicular rows and columns.

5. The apparatus of claim 3, wherein said support members of said at least two vertically stacked mats are substantially vertically aligned.

6. The apparatus of claim 4 further comprising means for maintaining said support members in substantially vertical alignment.

7. The apparatus of claim 6 wherein said means for maintaining comprises an elongated clip insertable into the interior of at least two vertically adjacent aligned support members.

8. A fluid container, comprising:
    a flexible, substantially fluid impermeable envelope;
    at least two stacked mats disposed within said envelope, each of said mats comprising:
        a backing grid having a plurality of intersecting struts defining grid openings therebetween; and
        a plurality of spaced support members projecting from said backing grid; and said mats forming fluid flow paths within said container.

9. The fluid container of claim 8, wherein each of said support members comprises a tubular member.

10. The fluid container of claim 9, wherein at least some of said support members on said stacked mats are disposed in at least partial axial alignment forming fluid flow paths through at least some of said support members.

11. The fluid container of claim 8, wherein each of said support members is substantially cylindrical.

12. The fluid container of claim 8, wherein at least two of said support members on said stacked mats are tubular and disposed in at least partial axial alignment forming a fluid flow path; and
    a retaining member securing said at least two support members in said at least partial axial alignment.

13. The fluid container of claim 12, wherein said retaining member comprises an elongated member extending through said at least two support members.

14. The fluid container of claim 13 wherein said retaining member comprises a clip having two elongated substantially transverse flanges connected along a common longitudinal edge.

15. A fluid container, comprising:
    a flexible, substantially fluid impermeable envelope;
    at least two vertically stacked mats disposed within said envelope, each of said mats comprising:
        a backing grid having a plurality of intersecting struts defining grid openings therebetween; and
        a plurality of spaced tubular support members projecting from said backing grid; and said mats forming fluid flow paths within said container; and
    at least two of said support members on said stacked mats disposed in at least partial axial alignment forming at least one vertical fluid flow path through said at least two support members.

16. The fluid container of claim 15 wherein each of said support members is substantially cylindrical.

17. The fluid container of claim 15, further comprising a retaining member securing said at least two support members in said at least partial axial alignment.

18. The fluid container of claim 17, wherein said retaining member comprises an elongated member extending through said at least two support members.

19. The fluid container of claim 18, wherein said retaining member comprises a clip having two elongated substantially transverse flanges connected along a common longitudinal edge.

20. The fluid container of claim 19, wherein said clip comprises a cap portion having a lateral extent sufficient to prevent passage of said clip member completely through said grid openings.

* * * * *